Aug. 7, 1951 — L. S. KUPERSMITH — 2,563,535
SELF-ALIGNING HUB
Filed June 18, 1947
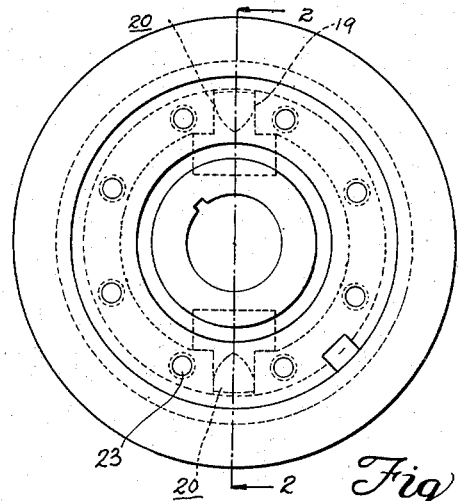
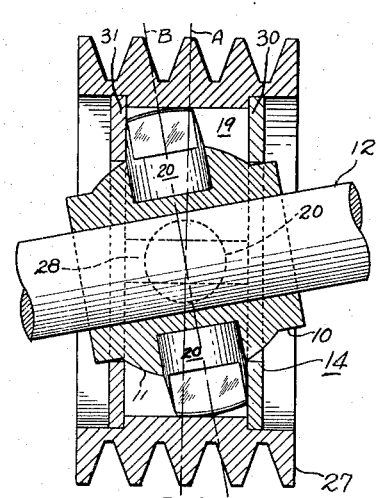
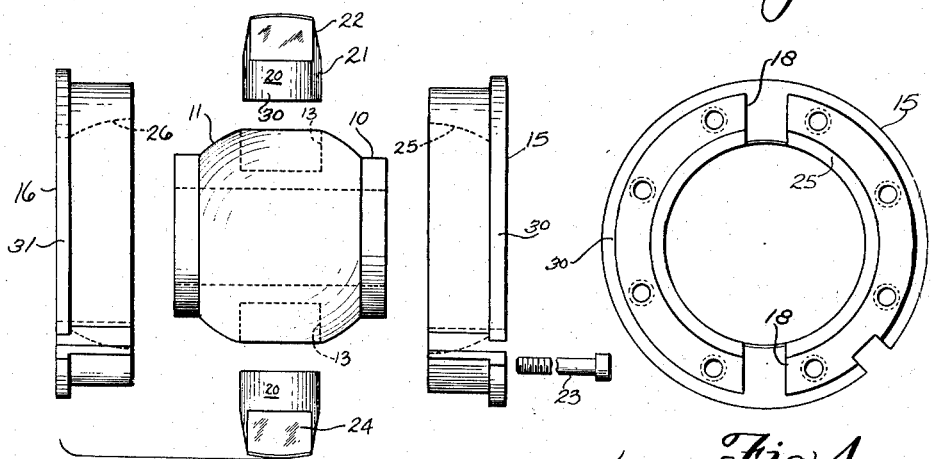
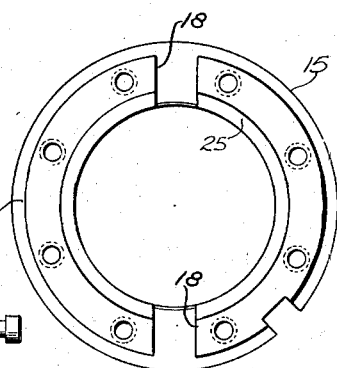
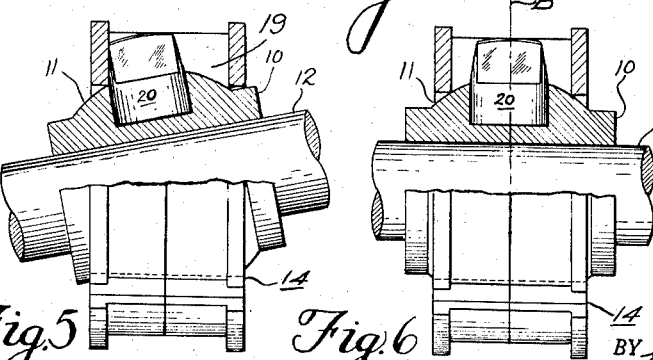
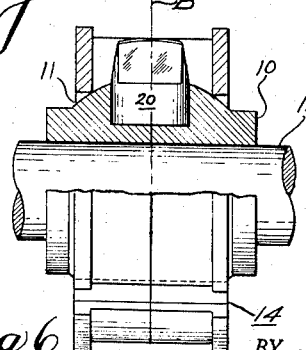
INVENTOR.
LEO S. KUPERSMITH
BY Woodling and Krost,
Attorneys.

Patented Aug. 7, 1951

2,563,535

UNITED STATES PATENT OFFICE 2,563,535

SELF-ALIGNING HUB

Leo S. Kupersmith, Cleveland Heights, Ohio

Application June 18, 1947, Serial No. 755,424

2 Claims. (Cl. 64—7)

My invention relates to universal power transmission devices in general, and more particularly to drive mechanisms adapted to compensate for angular misalignment between a prime mover and a driven machine.

The angular misalignment of a prime mover and a driven machine is a detriment to efficient operation. Misalignment will very often result in sprung or broken shafts, or burned out bearings. The misalignment may be caused by an overloaded driven machine, or quite often in mechanical misalignment when installed. Usually when there is misalignment, all parts deflect somewhat and the trouble is accentuated, resulting in still greater misalignment.

An object of my invention is to provide a hub having spherical external surfaces and a bearing having spherical internal surfaces to fit in a ball and socket manner upon the external surfaces of the hub, with the provision of automatically aligned force transmission members therebetween.

Another object of my invention is to provide a universal hub which will allow a free running fly wheel member to position itself to rotate in a condition of perfect dynamic balance.

Still another object of my invention is to provide force transmission pins between a driving and a driven member, which force transmission pins have a flat surface adapted to contact a flat wall surface of one of the members, and have a large curved surface contact area to contact a corresponding curved surface contact on the other member, and are thereby adapted to automatically position themselves to maintain large surface contact between the force transmission pins and the driving and driven members regardless of misalignment between the members.

Another object of my invention is to eliminate line drive transfer contact in a universal power transmission device, and provide a large surface contact area which is self alignable under all driving conditions to maintain the large surface contact.

Other objects and fuller understanding of my invention may be had by referring to the following description and claims, taken in conjunction with the accompanying drawing, in which:

Figure 1 is a side-elecational view of my improved universal alignment drive member;

Figure 2 is a cross-sectional view through the line 2—2 of Figure 1, with a phantom view of the top pin and slot added in the position it would assume upon one quarter of one revolution of the hub;

Figure 3 is an exploded view of my improved invention;

Figure 4 is a plan view of one of the half bearing members;

Figure 5 is an assembled view of my device partly in section with the hub and bearing member there of misaligned;

Figure 6 is an assembled view of my device partly in section with the hub and bearing member thereof aligned; and Figure 7 is a side view of my preferred interconnecting pin member.

In the drawing, I illustrate the preferred embodiment of my invention as applied to a V-belt drive, but it is to be understood that this basic unit of hub and bearing could be assembled in such devices as a flat belt pulley, a conveyor belt pulley, or in a sprocket or wheel for chain drive. Also, my device will serve to maintain perfect alignment in devices such as mating gears which are subject to deflection under load. That is, gears which are subject to heavy loads may be perfectly aligned when installed, but under loading deflection they will become misaligned and therefore mate only on the outer ends of the gear teeth. This is known as end bearing and of course, is the weakest part of the gear teeth. The engineer ordinarily uses gears of large size to prevent breakage under this deflection, but with my self-aligning device, the gears would always run together in perfect alignment, and therefore gears of smaller size may be used. Illustrate a hub 10 and a bearing member 14 with interconnecting bearing pins 20 therebetween. This device may be used to transmit power from either member thereof to the other, but for the purpose of clarity in this description, it will be assumed that the hub 10 is driven by a suitable rotary power source through the shaft 12, and that the bearing member 14 is driven by force transmitted from the hub 10 by means of the bearing pins 20.

As illustrated best in the Figure 3 of the drawings, the hub 10 is provided with spherical external surfaces 11 thereon. The bearing member 14 comprises a half bearing portion 15 and a half bearing portion 16. The half bearing portions 15 and 16 have internal spherical surfaces 25 and 26 respectively which are complementary to the external spherical surface 11 on the hub 10. Therefore, the half bearing portions 15 and 16 may be closed together upon the hub 10 and the internal surfaces 25 and 26 thereof will bearing the member 14 upon the hub 10. The half bearing portions 15 and 16 may be bolted together by a plurality of bolts 23 positioned around the circumference of the members 15 and 16 as illustrated in the Figure 1 of the drawings.

In order to transmit driving force from the hub 10 to the bearing member 14, or from the bearing member 14 to the hub 10, I have provided annularly spaced bearing pin members 20 to interconnect the hub 10 and the bearing member 14. My invention is not limited to any number of such bearing pins 20, because one such pin would transmit the driving force and function as intended in my invention. However, in the particular design of the embodiment illustrated, two pin members 20 are spaced on opposite sides of the hub in substantially axial alignment with one another for practical operative construction. Also, in order to retain lubrication between bearing surfaces, the pressure between mating surfaces should not exceed a pressure large enough to force the lubricant from between the mating bearing surfaces. Therefore, I have provided bearing pin members having the greatest possible bearing surfaces, in order that the unit pressure on the lubricant will be as low as possible. Furthermore, in the correct design of my preferred embodiment, the projected area of the shank portion 21 of the pin 20 should be substantially equal to the flat surface area 24 of the drive portion 22. Further a plurality of pins are provided in order to distribute the load and reduce the pressure on the lubricant still further. The elimination of line or point contact is the important feature of my invention. It is virtually impossible to retain lubrication between points or lines of contact, and therefore wear takes its effect quite rapidly. Annularly spaced socket recesses are provided about the periphery of the hub 10 as is best illustrated in the Figure 1 of the drawings, and further illustrated in the Figure 3 of the drawings. These socket recesses are indicated by the reference character 13. In the embodiment as illustrated, the recesses 13 have longitudinal axes extending radially of the hub 10 and are equally spaced substantially 180° apart about the periphery of the hub 10.

The bearing pins 20 and recesses 13 are substantially identical, and as previously explained, each of the bearing pins 20 may be used independently, but two oppositely positioned pins are commonly used for the purpose of distributing forces equally about the periphery of the hub 10. Therefore, in the remainder of this description reference will be made to only one bearing pin 20. It is understood that all bearing pins actually used will function in exactly the same way.

The bearing pin 20 is provided with a shank 21 having cylindrical wall surfaces 30 adapted to fit complementary to the wall surfaces of the socket recess 13. In the illustrated embodiment, the wall surfaces 30 of the pin 20, and the wall surfaces of the recess 13 are cylindrical, and therefore the pin 20 may be turned in the recess 13. The pin 20 has a drive portion 22 extending from the shank 21 outwardly of the recess 13, and the drive portion 22 is provided with a surface contact area 24.

Each of the half bearing members 15 and 16 is provided with a slot to correspond to each annularly spaced recess 13. That is, in the illustrated embodiment of the invention two recesses 13 for bearing pins 20 are employed. Accordingly, the half bearing member 15 is provided with two annularly spaced slots 18, and the half bearing member 16 is provided with two annularly spaced slots 17. The slots 17 and 18 of the members 15 and 16 respectively, are annularly spaced to correspond to or register with the recesses 13. The slots divide the half bearings into segments joined by flange members 30 and 31.

Therefore, when the members 15 and 16 are assembled over the hub 10, the slots 17 and 18 are brought together to form one continuous long abutment surface slot, and the resulting slot 28 may be positioned to register with a recess 13. For each recess 13, therefore, there is a corresponding abutment slot on the bearing member 14. The drive portion 22 of the pin 20 is adapted to extend into the compounded slot formed by slots 17 and 18, 28, and the surface contact area 24 of the bearing pin 20 is therefore adapted to contact the corresponding flat wall surface 19 of the compound slot to produce a surface area contact therebetween, as distinguished from a line contact therebetween. It is to be understood that although only two socket recesses, and two corresponding slots are illustrated, a plurality of such slots and recesses may be provided, and one or two pins 20 inserted into alternate combinations of slot and recesses as wear on one combination takes place, in order to extend the useful life of the hub.

In the illustration, I have shown a V-belt drive member 27 secured to the bearing member 14 for rotation therewith. However, any driven member, for example a flat belt drive or a gear might be secured to rotate with the bearing member 14, but my invention is in no wise limited to such an adaptation.

The compound slots formed by slots 17 and 18 are closed on each end by annular flange member 30 on half bearing 15 and flange member 31 on half bearing 16, and are closed on the bottom by the spherical surface 11 of hub 10. The internal surface of the V-belt drive member 27 then closes the top of the slots. Therefore, grease or oil may be effectively maintained in position to lubricate the pins 20.

The bearing member 14 is adapted to rotate about a plane of rotation indicated by the reference character A. The longitudinal axes of the plugs 20 are in a plane of rotation indicated by the reference character B. When the hub 10 and bearing member 14 are in perfect alignment, the planes of rotation A and B will be positioned together as one plane as illustrated in Figure 6. In the case of perfect alignment there will be no sideways movements of the flat surface of the pin 20 relative to the flat surface 19, and there will be no rotary movement of the pin shank 21 in the recess 13. However, misalignment of the planes A and B often occurs and then the planes A and B will be offset relative to one another as illustrated in the Figure 2. The angle between A and B is the amount of misalignment between the hub 10 and the bearing member 14.

In order to illustrate the operation of my device clearly, when the plane A and B are misaligned, the action of the plug 20 shown at the top of the Figure 2 will be described through one quarter of a revolution.

Under these assumed misalignment conditions, it will readily be seen that the flat surface 19 at the top position in Figure 2 and the axis of the shaft 12 will be shifted sideways relative to one another, but will remain in a plane common to both. Consequently, the surface contact area 24 of the pin 20 is also in a plane with the axis of the shaft 12.

When the pin 20 moves from the uppermost position illustrated in Figure 2 to a position wherein its longitudinal axis is horizontal, or in other words as shown in the phantom lines behind the shaft 12 in the Figure 2, the surface contact area 24 and the flat surface 19 on the bearing member 14 will be in a position at an angle to the axis of the shaft 12 rather than in a plane with the axis of shaft 12. Therefore, when the plug 20 is in the top position as illustrated in the Figure 2, the surface contact area 24 thereof is in a plane with the axis of the shaft 12, but when the pin 20 is in a horizontal position, the surface contact area 24 thereof is at an angle to the axis of the shaft 12. In order to maintain the surface contact area 24 in flat contact with the flat surface 19, the shank 21 of the pin 20 will turn in the socket 13 as the pin 20 moves from the vertical to the horizontal position. Also, when the plane of rotation A and B are misaligned relative to one another as illustrated in the Figure 2, the pin 20 will be at the left side of the flat surface 19 when in the uppermost position as illustrated in the Figure 2, but will be at the right side of the flat surface 19 when in the lower position as illustrated in the Figure 2. Therefore, as the pin 20 revolves about the shaft 12, it is required to move from the left to the right side of the flat surface 19. Accordingly, the surface contact area 24 of the pin 20 must slide relative to the flat surface 19 of the bearing member 14. Thus, as the pin 20 revolves about the shaft 12, if the planes of rotation A and B are misaligned relative to one another, the plug 20 is turned in the socket 13 and slides relative to the flat surface 19. Thus, the pin 20 is adapted to transmit force from one of the members to the other member and will always maintain a surface area contact between the surface contact area 24 and the flat surface 19.

Although the most obvious use for my device is the automatic alignment of pulleys and gears as described, another important use may be made of the device, and it is believed best to specifically point it out.

Fly wheels, and in fact all rapidly rotating members are subject to dynamic unbalance as well as static unbalance. However, a wheel may be in perfect static balance, and be in dynamic imbalance. If the wheel is mounted on a shaft with ordinary bearings, a severe vibration will be set up. But, if the wheel is mounted on the shaft with my improved device, the wheel may find its proper plane of rotation, and therefore there will be no vibration or undue wear of bearings.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Self-alignment drive means comprising, a ball hub member having a spherical external surface, a first and second socket member portion each having a radial flange and a plurality of annularly spaced segment members extending laterally from said flange, said radial flange of said first and second socket members constituting a connection for holding the segments together, said segments each having flat side walls defining annularly spaced abutment wall portions therebetween, said segment members each having a spherical internal surface, means securing the said first and second socket portions together, with the segments extending between said flanges as a bearing unit about said ball hub with the internal spherical surfaces of the bearing unit being complementary to the external spherical surface of the ball hub member, said annular spaced abutment wall portions of said first and second socket members registering and defining complete bearing unit flat wall abutment surfaces, said ball hub member having a plurality of cylindrical socket recesses annular spaced about the said spherical external surface each extending from the surface inwardly of the ball hub member, each socket recess having a longitudinal axis extending radially of the ball hub member, an interconnecting bearing pin member extending from at least one of said socket recesses of the ball hub member, said pin member having a cylindrical shank portion with wall surfaces complementary to the wall surfaces of the recess and being adapted to rotatably seat in said recess, and having a flat surface drive portion adapted to extend from the recess and contact the flat surface thereof against a flat wall abutment surface of the bearing unit, said flat surface contact area and the projected area of the cylindrical surface of the pin being substantially equal to provide substantially equal surface pressure during drive transmission.

2. Self-alignment drive means comprising, a ball hub member having a spherical external surface, a first and second socket member portion each having a radial flange and a plurality of annularly spaced segment members extending laterally from said flange, said radial flange of said first and second socket members constituting a connection for holding the segments together, said segments each having flat side walls defining annularly spaced abutment wall portions therebetween, said segment members each having a spherical internal surface, means securing the said first and second socket portions together as a bearing unit about said ball hub with the internal spherical surfaces of the bearing unit being complementary to the external spherical surface of the ball hub member, said annular spaced abutment wall portions of said first and second socket members registering and defining complete bearing unit flat wall abutment surfaces, said ball hub member having a plurality of cylindrical socket recesses annularly spaced about the said spherical external surface each extending from the surface inwardly of the ball hub member, each socket recess having a longitudinal axis extending radially of the ball hub member, an interconnecting bearing pin member extending from at least one of said socket recesses of the ball hub member, said pin member having a cylindrical shank portion with wall surfaces complementary to the wall surfaces of the recess and being adapted to rotatably seat in said recess, and having a flat surface drive portion adapted to extend from the recess and contact the flat surface thereof against a flat wall abutment surface of the bearing unit, said flat surface contact area and the projected area of the cylindrical surface of the pin being substantially equal to provide substantially equal surface pressure during drive transmission.

LEO S. KUPERSMITH.

REFERENCES CITED

The following references are of record in the file of this patent:

UNITED STATES PATENTS

| Number | Name | Date |
|---|---|---|
| 294,877 | Jarvis | Mar. 11, 1884 |
| 352,220 | Bushnell | Nov. 9, 1886 |
| 1,188,965 | Maxwell et al. | June 27, 1916 |
| 1,269,068 | Evans | June 11, 1918 |
| 1,630,886 | Beyer | May 31, 1927 |

FOREIGN PATENTS

| Number | Country | Date |
|---|---|---|
| 284,948 | Great Britain | of 1928 |